United States Patent

[11] 3,629,584

| [72] | Inventor | Oscar C. Blomgren, Jr. |
| | | Lake Bluff, Ill. |
| [21] | Appl. No. | 76,013 |
| [22] | Filed | Sept. 28, 1970 |
| [45] | Patented | Dec. 21, 1971 |
| [73] | Assignee | Inter-Probe, Inc. |
| | | North Chicago, Ill. |

[54] METHOD AND APPARATUS FOR THE NONDESTRUCTIVE TESTING OF MATERIALS
17 Claims, 4 Drawing Figs.

[52] U.S. Cl.......................................... 250/83.3
IR, 73/15 R, 250/49.5 GC, 250/65 R, 250/83.3 D, 324/54
[51] Int. Cl...................................................... G03b 41/00,
G01t 1/16
[50] Field of Search.......................................... 73/15 R, 15
A; 250/65 R, 83.3 IR, 83.3 D, 49.5 GC; 324/54

[56] References Cited
UNITED STATES PATENTS

| 3,434,332 | 3/1969 | Maley | 73/15 R |
| 3,504,524 | 4/1970 | Maley | 73/15 R |

*Primary Examiner*—Anthony L. Birch
*Attorney*—Kinzer, Dorn and Zickert

ABSTRACT: A method and apparatus to determine the integrity of a wide range of materials, including electrically conductive and dielectric materials, wherein the material to be tested is first heated uniformly either naturally in the process of fabricating the material or otherwise to a temperature sufficient for it to give off detectable infrared and/or visible radiation. The material is next subjected to an electrostatic field which cools the material. During the cooling process, the material is monitored with a radiation detector which indicates by a differential in cooling rate the presence of any internal or surface defects.

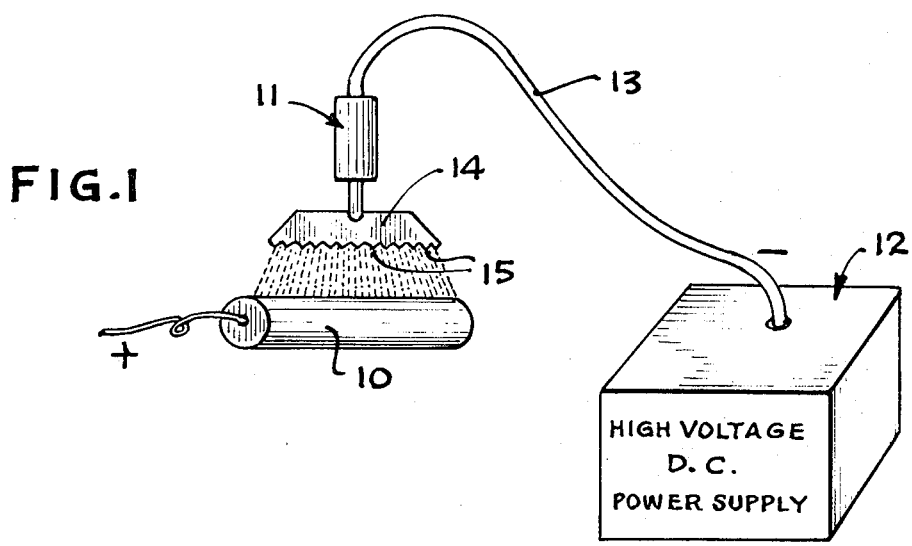
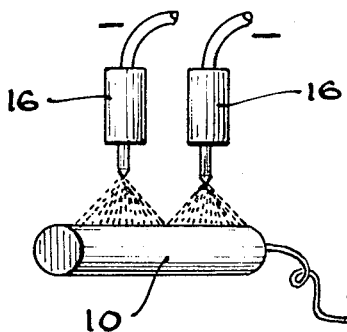
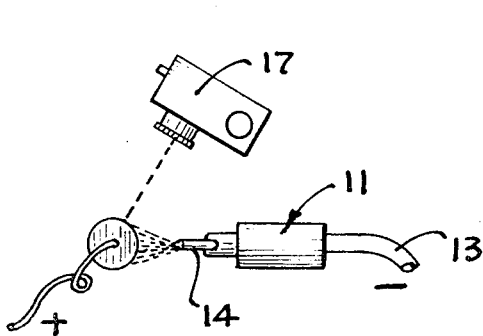
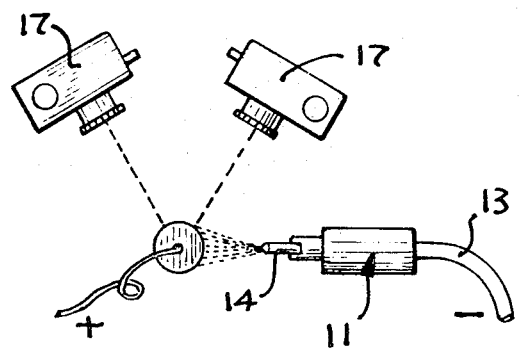

METHOD AND APPARATUS FOR THE NONDESTRUCTIVE TESTING OF MATERIALS

This invention relates to a method and apparatus for detecting both surface and internal flaws or defects in a wide range of materials including those that are electrically conductive as well as those that are dielectrics.

The method is based upon the fact that a hot object placed in a high-voltage electrostatic field transfers its heat evenly and rapidly to the ambient atmosphere surrounding it. While the mechanism causing this rapid heat transfer is not fully understood, it has been well established that the electrostatic field provides an increase in the convective heat transfer rate of from three to 10 times normal.

This increase in the conductive heat transfer rate is thought to be caused by the bombardment of the surface of the hot object with highly ionized particles that disturb the boundary layer at the interface between a solid and a surrounding gaseous atmosphere. An undisturbed boundary layer slows the convective heat transfer rate by insulating the hot object from the molecules of gaseous atmosphere surrounding it.

The nondestructive testing method of the invention generally includes uniformly heating the object to be tested, such as a metal forging or a casting to a temperature that will give off infrared and/or visible radiation in a detectable amount. It is then subjected to an electrostatic field that envelops it in its entirety for cooling, and the radiation emission pattern is monitored by a suitable sensing device.

Accordingly, it is an object of the present invention to provide a unique method and apparatus for determining structural defects or flaws in bodies of material.

Another object of the present invention is in the provision of a new and improved method and apparatus for conducting nondestructive testing of materials to determine structural defects, wherein such defects occur in both electrically conductive and dielectric materials.

A further object of the invention resides in the provision of the method and apparatus for testing materials for defects which includes heating the material to be tested to a temperature such that it will emit detectable infrared and/or visible radiation, subjecting the material to an electrostatic field to cause rapid cooling thereof, and monitoring the radiation emission pattern.

Other objects, features and advantages of the invention will be apparent from the following detailed disclosure, taken in conjunction with the accompanying sheet of drawing, wherein like reference numerals refer to like parts, in which:

FIG. 1 is a diagrammatic view of an application where an object at elevated temperature may be quickly and rapidly cooled;

FIG. 2 is a diagrammatic view of an electrostatic field being generated for an object, by use of probes of a different configuration than that shown in FIG. 1.

FIG. 3 is a generally diagrammatic view of an apparatus capable of testing an object for defects, in accordance with the present invention, and illustrating the cooling application of FIG. 1 and a monitoring device for detecting the radiation emission pattern of the object during cooling thereof; and FIG. 4 is a view similar to FIG. 3 but illustrating a plurality of radiation detectors.

Generally, the nondestructive testing method of the invention, when used to detect flaws or defects in or on an object, includes heating the object uniformly either naturally in a process involving fabrication of the object or otherwise to a temperature sufficient that it will readily give off detectable radiation in the infrared and/or visible range. The object is then rapidly and uniformly cooled by subjecting it to an electrostatic field powered by a high-voltage DC power supply, the voltage level of which will depend upon the amount needed to obtain rapid cooling. At a point in the cooling process, the radiation emitted from the object is detected by a suitable radiation detector. Analyzing the radiation pattern will then reveal whether there are any internal or external flaws, as well as their nature and significance.

The electrostatic field is created through the use of a high-voltage DC power supply of from 10 to 250 kilovolts, the voltage needed depending upon the material type and size of the object together with the equipment employed to generate the field. The power supply is directed by means of cables to a series of needlelike or toothed metallic points. These needlelike or toothed metallic points are placed equidistantly from the heated object, and sufficiently far from it as to be just outside of the point of incipient arc for the voltage being applied, this point being where the most efficient electrostatic field can be generated to cause rapid cooling of the object. Most generally, but not necessarily, the needlelike or toothed points are negative in polarity for several reasons. The distance over which the energy will spark at a given voltage is thought to be approximately doubled if the points are of negative potential. The negative field is more stable than the positive field under the geometry involved in this process. Also, discharge points of negative polarity do not produce as much ozone as those of positive polarity.

The hot object is grounded and a series of needlelike or toothed emission points is used to direct a potential at the object, and a corona appears on the points or teeth. With sufficient voltage, the hot object, whether an electrically conductive or dielectric material, becomes a passive electrode, the surface of which also is covered by corona.

Under these conditions the hot object begins to lose its heat rapidly and uniformly on all of its surfaces exposed to the electrostatic field. Monitoring the hot object with a camera using infrared sensitive film, or with an optical infrared scanning device or with any other suitable sensing device, reveals a steady and even decrease in the infrared emission rate of the object indicating uniform cooling. If the object is heated to incandescence, the cooling process is apparent to the naked eye, and it may be monitored by a camera using light sensitive film or other device.

If the object has a surface irregularity in the form of a microscopic blemish, inclusion of a foreign material, or other defect, the corona that it carries as a passive electrode is inclined to concentrate on the defect. Because it does, that spot or area will cool at a faster rate than the remaining surface of the object and therefore at a given point of time during the cooling process can be detected to be giving off less infrared or visible radiation than surrounding areas, thereby establishing a radiation emission pattern. No conventional means of cooling will seek out and indicate a defect in this manner.

If there is a subsurface void within the heated object, or an inclusion, the thermal conductivity rate of which is different than that of the material of which the object is made, or if there is an internal crack or fissure within the object, it also will be detected at a given point of time as an area or spot that is giving off less infrared or visible radiation than the general surface.

Since the cooling rate of the object is proportional to the voltage with which the field is created, and since the voltage can be precisely controlled, the object may be cooled more or less rapidly thus providing a cooling rate at which the difference in infrared or visible radiation between the normal area of the object and the defect in the object is most apparent.

Because the process of the invention requires that the object to be tested be elevated in temperature in order that the electrostatic field can cool it and cause a detectable difference in the cooling rate between a normal area and a defect, the process may be used at a very early stage in the production of castings, forgings, sintered products, etc. It also could be used for inspecting welds for defects during a welding process. This fact means that high labor and machining input on defective materials can be avoided at a very early and economical stage of production, and that the process lends itself ideally to in-process defect detection. An additional advantage is that the noncontact cooling attendant to the process is a desirable normal function during manufacture and processing of various materials.

Referring now to the drawings, and particularly to FIG. 1, an application is there shown for cooling an object 10, which includes generally a probe 11 and a high-voltage DC power supply 12. The probe 11 is attached preferably to the negative terminal of the power supply 12 by means of a suitable shielded cable 13. It should be appreciated that the probe could be connected to the positive terminal of the power supply, but that the cooling process is more efficient when a negative potential is applied to the probe. The probe 11 includes a metal blade-shaped electrode 14 having a plurality of needlelike or sharp tooth-shaped points 15 arranged in juxtaposed position and from which the potential is directed. As already mentioned, the object 10 would be uniformly heated, and the probe 11 would be arranged to uniformly envelop the object 10 in an electrostatic field. The potential level would be that needed to accomplish the desired cooling rate, it being appreciated that between 10 and 250 kilovolts would be needed.

While it is preferred that a probe which is contoured to the object be used in order to provide a uniform electrostatic field, it should be appreciated that the field could also be defined by use of a plurality of individual needlelike probes such as the probes 16 shown in FIG. 2. The object 10 is either grounded or connected to the positive terminal of the power supply 12.

Where the application is according to FIG. 1 to generate the electrostatic field for the object, the radiation pattern emitted from the object during the cooling process may be detected by a radiation detector 17 in a manner such as shown in FIG. 3, or by a plurality of radiation detectors 17 as shown in FIG. 4. The radiation detector may take the form of an infrared camera, a scanner, or other sensing device and it will be appreciated that the detector will serve to properly detect the radiation pattern at a given point during the cooling process which will reveal any structural flaws in the object. If the object is not hot, any suitable means may be provided for heating the object uniformly throughout to a temperature which will provide an adequate temperature level which will enable the object to readily give off radiation that can be detected by the radiation detector employed. Suitable other controls may be employed to assist in determining the point of desired radiation detection. It will also be appreciated that the radiation pattern may be detected by an optical system in the event that the object is heated to incandescence to give off visible radiation.

Should the object to be tested take an irregular form, the cooling probe would be contoured accordingly in order to induce a uniform electrostatic field on or within the object. The probe will be spaced from the object a distance just outside of the point at which arcing would be supported between the probe and object, this being the point where most effective cooling of the device can be accomplished.

As above mentioned, the present invention applies to the testing of both electrically connected and dielectric materials. Where metals are tested, external and internal metallurgical defects can be determined, as they would show in the radiation emission pattern.

It should be appreciated that a testing instrument could be provided which would be capable of carrying out the steps of the invention. Also, automated equipment could be provided for continuous testing and recording.

It will be understood that modifications and variations may be effected without departing from the scope of the novel concepts of the present invention, but it is understood that this application is to be limited only by the scope of the appended claims.

This invention is hereby claimed as follows:

1. A nondestructive method of testing a body of material for structural defects comprising the steps of: subjecting a body that is at a temperature rendering it capable of emitting detectable radiation energy to a uniform electrostatic field such as to cause rapid and uniform cooling thereof, and monitoring the radiation pattern emitted from the body.

2. The method as defined in claim 1, wherein the body temperature is at a point where it will give off detectable infrared energy.

3. The method as defined in claim 1, wherein the body is at a point where it will give off detectable visible energy.

4. The method as defined in claim 1, wherein the step of subjecting the body to an electrostatic field includes grounding the object, spacing probe means adjacent the object and connecting the probe means to a source of high-voltage direct current potential such that will cause rapid cooling of the object.

5. The method as defined in claim 4, wherein the step of spacing the probe means adjacent the object includes the step of spacing the probe means just outside the point of incipient arcing.

6. The method as defined in claim 5, wherein the polarity of the potential is negative.

7. The method as defined in claim 5, wherein the polarity of the potential is positive.

8. The method as defined in claim 1, wherein the step of monitoring includes the step of recording the radiation pattern across the body at a given point during the cooling.

9. An apparatus for performing nondestructive testing of an object to determine if structural defects exist, said apparatus comprising, means for heating the object uniformly to a temperature sufficient for it to give off detectable radiation energy, means for subjecting the object to an electrostatic field such as to cause rapid and uniform cooling thereof, and means for monitoring the radiation pattern emitted from the body.

10. An apparatus as defined in claim 9, wherein the means for subjecting the object to an electrostatic field includes means grounding the object, probe means adjacent to but spaced from the object for directing an electrostatic discharge toward the object, and means for supplying a high-voltage direct current potential to the probe means of sufficient voltage as to cause rapid cooling of the object.

11. An apparatus as defined in claim 10, wherein the polarity of the potential is negative.

12. An apparatus as defined in claim 10, wherein the polarity of the potential is positive.

13. An apparatus as defined in claim 9, wherein the monitoring means includes means for recording the radiation pattern at a given point during the cooling of the object.

14. An apparatus as defined in claim 9, wherein the monitoring means includes an infrared camera.

15. An apparatus as defined in claim 9, wherein the monitoring means includes a visible camera.

16. An apparatus as defined in claim 9, wherein the monitoring means includes an infrared scanning device.

17. An apparatus as defined in claim 9, wherein the monitoring means includes a radiation sensing instrument.

* * * * *